Figures 1, 2:
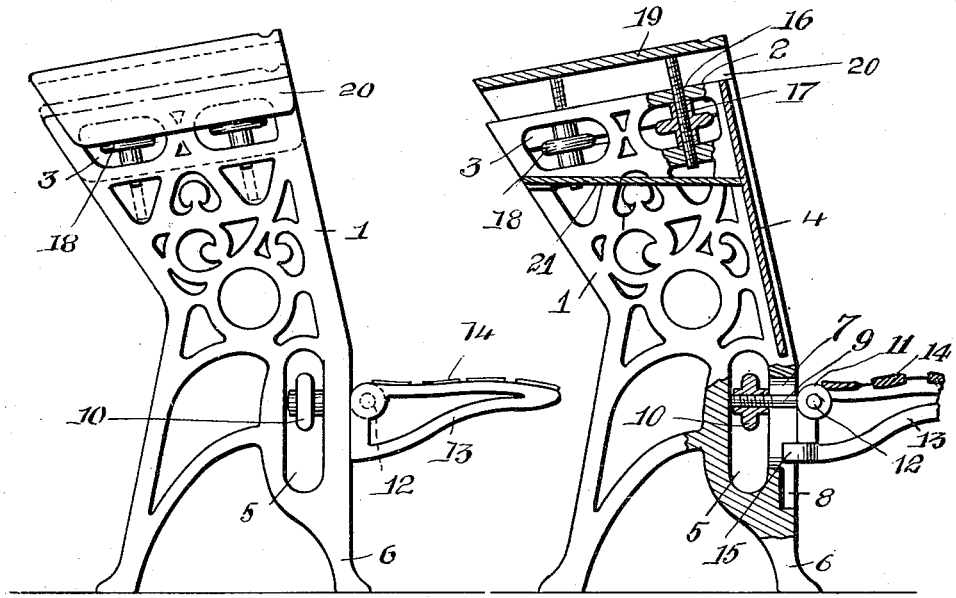

P. L. ROSS.
ADJUSTABLE SCHOOL FURNITURE.
APPLICATION FILED APR. 27, 1911.

1,008,992.

Patented Nov. 14, 1911.

WITNESSES:

INVENTOR.
P. L. Ross,
BY
ATTORNEYS.

UNITED STATES PATENT OFFICE.

PERRY L. ROSS, OF KANE, PENNSYLVANIA.

ADJUSTABLE SCHOOL FURNITURE.

1,008,992. Specification of Letters Patent. Patented Nov. 14, 1911.

Application filed April 27, 1911. Serial No. 623,688.

*To all whom it may concern:*

Be it known that I, PERRY L. Ross, a citizen of the United States of America, residing at Kane, in the county of McKean and State of Pennsylvania, have invented certain new and useful Improvements in Adjustable School Furniture, of which the following is a specification, reference being had therein to the accompanying drawing.

This invention relates to adjustable school furniture, and more particularly to combined benches and desks.

The object of the invention is to provide a desk with an adjustable top and with an adjustable bench, whereby the desk can be used by juveniles of various ages.

I attain the above object by a mechanical construction that is simple, durable, easy to manipulate, inexpensive to manufacture, and highly efficient for the purposes for which it is intended.

The invention will be hereinafter specifically described and then claimed, and reference will now be had to the drawing, wherein:—

Figure 3:
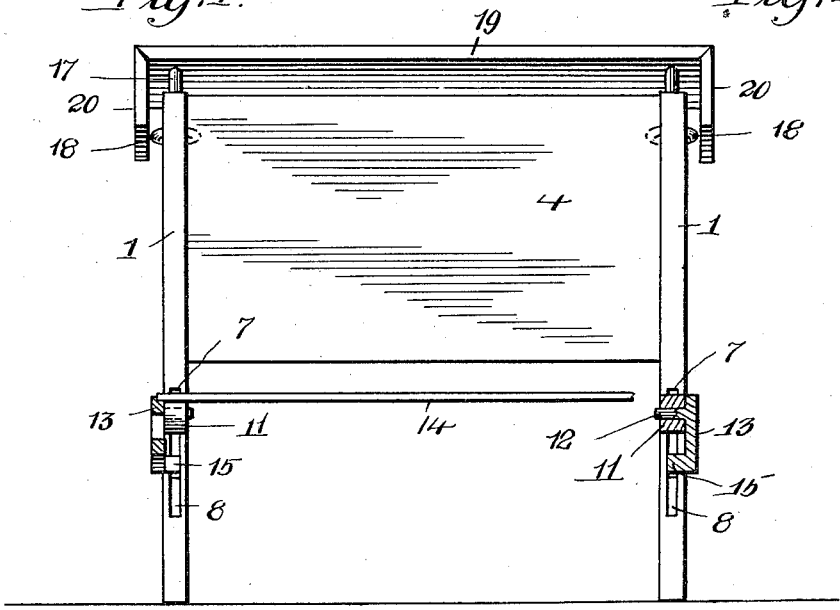

Figure 1 is a side elevation of the desk, Fig. 2 is a vertical sectional view of the same, and Fig. 3 is a front elevation of the same partly broken away and partly in section.

A desk in accordance with this invention is made of wood and metal, and comprises skeleton side frames 1 made of metal, said frames having the upper edges thereof inclined, as at 2 and adjacent to the upper edges are openings 3. The frames are connected by a back plate 4 and adjacent to the lower edge of the back plate said frames are provided with openings 5.

The forward legs 6 of the frames 1 have vertical slots 7 in communication with the openings 5 and the material bordering upon the lower ends of said slots is cut away to provide recesses 8. Extending through the slots 7 are bolts 9 having the inner threaded ends thereof provided with nuts 10 and the outer ends thereof with apertured heads 11. The openings 5 provide clearance for the nuts 10 and said nuts can be easily adjusted to bind the heads 11 against the forward sides of the legs 6.

Extending into the heads 11 are inwardly projecting pins 12 carried by triangular-shaped seat frames 13, said frames being connected by slats 14. The lower ends of the seat frames 13 have side extensions 15 adapted to engage the forward sides of the legs 6 and extend into the slots 7 thereof, these extensions supporting the seat frames in approximately a horizontal position.

The upper ends of the frames 1 are provided with openings 16 and extending through said openings into the openings 3 are the lower threaded ends of bolts 17. Located within the openings 3 are nuts 18 for adjusting said bolts. The upper ends of the bolts 17 support a desk top 19 having depending side flanges or walls 20. The side frames 1 support a horizontal platform or shelf 21, adjacent to the upper ends thereof.

From the foregoing it will be observed that the desk top can be raised or lowered by adjusting the nuts 18, and that by adjusting the nuts 10 the seat or bench can be raised or lowered.

What I claim is:—

In combination, a desk including side frames, adjustable connecting bolts mounted in the lower portion of said frames and having their heads arranged forwardly of the frames and formed centrally with openings extending in planes parallel to the lower portion of the front of said frames, a pair of seat frames, each having its inner ends at its top formed with an inwardly extending pin and at the lower portion of its inner end with an angleshaped lug, one arm of the lug extending in an opposite direction with respect to the direction in which said pin extends, said pins mounted in the heads of the bolts, and said lugs having one arm abutting against the side frames and the other arm extending into the side frames, said pins pivotally connecting the said frames to said adjustable bolts.

In testimony whereof I affix my signature in the presence of two witnesses.

PERRY L. ROSS.

Witnesses:
MAX W. SROLOVITZ,
CHRISTINA T. HOOD.